(12) United States Patent
Zerfass et al.

(10) Patent No.: US 9,112,193 B2
(45) Date of Patent: Aug. 18, 2015

(54) SEALING ARRANGEMENT FOR HIGH-TEMPERATURE FUEL CELL STACK

(75) Inventors: Hans-Rainer Zerfass, Taunusstein (DE); Dirk Federmann, Kevelaer (DE)

(73) Assignee: FORSCHUNGSZENTRUM JUELICH GMBH, Juelich (DE)

(*) Notice: Subject to any disclaimer, the term of this patent is extended or adjusted under 35 U.S.C. 154(b) by 924 days.

(21) Appl. No.: 12/735,643

(22) PCT Filed: Feb. 18, 2009

(86) PCT No.: PCT/DE2009/000221
§ 371 (c)(1),
(2), (4) Date: Aug. 11, 2010

(87) PCT Pub. No.: WO2009/112005
PCT Pub. Date: Sep. 17, 2009

(65) Prior Publication Data
US 2011/0003228 A1    Jan. 6, 2011

(30) Foreign Application Priority Data

Mar. 8, 2008   (DE) .................. 10 2008 013 281

(51) Int. Cl.
*H01M 8/24* (2006.01)
*B23K 31/02* (2006.01)
(Continued)

(52) U.S. Cl.
CPC ............ *H01M 8/0282* (2013.01); *B23K 1/008* (2013.01); *B23K 1/0008* (2013.01); *F16J 15/064* (2013.01);
(Continued)

(58) Field of Classification Search
None
See application file for complete search history.

(56) References Cited

U.S. PATENT DOCUMENTS

| 3,844,777 A | 10/1974 | Werner |
| 6,410,161 B1 | 6/2002 | Li |

(Continued)

FOREIGN PATENT DOCUMENTS

| CN | 1474732 | 2/2004 |
| CN | 1887499 | 1/2007 |

(Continued)

*Primary Examiner* — Barbara Gilliam
*Assistant Examiner* — Stephan Essex
(74) *Attorney, Agent, or Firm* — Jordan and Hamburg LLP

(57) ABSTRACT

Disclosed is a sealing assembly for metal components, wherein the sealing assembly has an electrical insulating effect, and wherein the sealing assembly comprises a ceramic layer and a base brazing material disposed thereon, to which germanium is added. The addition of germanium advantageously ranges from 0.1 to 5.0 mol %, and preferably between 0.5 and 2.5 mol %. A particular embodiment provides for the use of a brazing material which additionally comprises silicon in the range of >0 to 2.5 mol %, and preferably between 0.1 and 0.9 mol %. Furthermore, a brazing material having a further addition of 10 to 40% by volume of $Al_2TiO_5$, and preferably between 20 and 30% by volume of $Al_2TiO_5$, has proven to be particularly suited for the sealing assembly. The use of the special brazing material composition inside the sealing assembly generally results in reproducibly tight and insulating joints having the following properties: a) escape of brazing material is prevented and running of brazing material is reduced, b) the porosity of the brazing material (primarily individual pores or narrow pore lines) is markedly reduced, c) the brazed joints have sufficient electrical resistance, and d) the brazed joints are generally sufficiently gas-tight (leakage rate during He leakage test $<10^{-3}$ mbar*$1$*$s^{-1}$).

13 Claims, 1 Drawing Sheet

(51) Int. Cl.
*B32B 15/04* (2006.01)
*H01M 8/02* (2006.01)
*B23K 1/00* (2006.01)
*B23K 1/008* (2006.01)
*F16J 15/06* (2006.01)
*F16J 15/10* (2006.01)
*H01M 8/12* (2006.01)

(52) U.S. Cl.
CPC ............ *F16J 15/102* (2013.01); *H01M 8/0286* (2013.01); *H01M 2008/1293* (2013.01); *Y02E 60/50* (2013.01); *Y02E 60/525* (2013.01); *Y10T 428/31678* (2015.04)

(56) References Cited

U.S. PATENT DOCUMENTS

| | | | |
|---|---|---|---|
| 2003/0132270 A1 | 7/2003 | Weil et al. | |
| 2004/0056074 A1* | 3/2004 | Sjodin | 228/183 |
| 2006/0083978 A1 | 4/2006 | Zerfass et al. | |
| 2007/0003811 A1* | 1/2007 | Zerfass et al. | 429/35 |
| 2007/0065707 A1 | 3/2007 | Zerfass et al. | |
| 2008/0131723 A1* | 6/2008 | Tucker et al. | 428/623 |
| 2008/0220313 A1 | 9/2008 | Zerfass et al. | |
| 2008/0268323 A1* | 10/2008 | Tucker et al. | 429/36 |

FOREIGN PATENT DOCUMENTS

| | | | |
|---|---|---|---|
| CN | 101068647 | | 11/2007 |
| DE | 2349966 | | 4/1974 |
| DE | 100 00 988 | | 7/2001 |
| DE | 10 2004 047539 | | 4/2006 |
| DE | 10 2005 029 762 | | 12/2006 |
| DE | 10 2005 048 213 | | 4/2007 |
| DE | 10 2006 039339 | | 3/2008 |
| EP | 1 246 283 | | 10/2002 |
| JP | 60-29434 | | 2/1985 |
| JP | 60029434 A | * | 2/1985 |
| WO | WO-2006/086037 | | 8/2006 |

* cited by examiner

SEALING ARRANGEMENT FOR HIGH-TEMPERATURE FUEL CELL STACK

The invention relates to a high-temperature fuel cell system, and particularly to a sealing assembly for a fuel cell stack comprising oxide ceramic electrolytes (SOFC=solid oxide fuel cell), and to a method for the production thereof.

BACKGROUND OF THE INVENTION

Fuel cells are sources of electric power, in which chemical energy is converted into electric energy by the electrochemical oxidation of an easily oxidizable substance, typically hydrogen by oxygen. Given the low voltage that each individual fuel cell supplies, a large number of fuel cells are generally joined in series, using what are known as interconnectors, in order to increase the electric output, and the fuel cells are joined and sealed in an electrically insulating manner by way of solder glass. These are then referred to as fuel cell stacks or stacks. The individual cell levels, which is to say the ceramic cells comprising the metal interconnector, are also referred to as cassettes. In the stack design, it is necessary to join the individual cassettes along a stack direction not only in an electrically insulated manner, but also in a gas-tight manner. It is necessary to separate the fuel gas ducts of the fuel cell stack in a gas-tight manner from the oxidizing agent chambers of the fuel cell units, and to separate the oxidizing agent ducts of the fuel cell stack from the fuel cell units. The gas supply openings in the cassettes are simultaneously joined to each other by the seals that are applied.

The operating temperature of a high-temperature fuel cell stack (SOFC stack) ranges between 700 and 900° C. A SOFC stack having planar fuel cells typically comprises ceramic cells and metal interconnectors. To this end, the ceramic cell is installed in a metal frame, which in turn is joined to the interconnector. In known fuel cell stacks, sealing and insulating elements made of solder glass or ceramic sealing materials are used in order to bring about the necessary electrical insulating action and the necessary gas tightness.

In general, it is expedient to separate the seal and electrical insulation from each other. The electrical insulation in such a case can be established, for example, by a ceramic element, which is joined to the sheet metal parts by brazing. As a result of the gas-tight brazing bond, the gas supply openings are also sealed at the same time. Here, it is possible to directly braze the ceramic under vacuum to the steel components using active brazing materials.

When joining the stack levels and/or the cassettes to each other, the ceramic cells are usually already integrated in the corresponding joining partners, and thus irreversible damage to the cell is possible during brazing under vacuum due to thermochemical processes (reduction). For this reason, joining in the presence of the cell should always be carried out in an oxidizing atmosphere, such as air.

According to the prior art, it is also possible to use silver-based fillers for this joining in air. These brazing materials allow brazing in air when they contain quantities of additives, such as copper oxide, which promote wetting. Thus, these brazing materials are referred to as RAB (reactive air brazing) materials.

Depending on how the insulating ceramic is produced, it may comprise pores and/or gaps. This is the case, for example, when the ceramic layer is applied onto the metal parts to be insulated by way of a thermal spraying process. Depending on the capillary activity of the brazing material that is used, the material can then penetrate into the gaps that are present and cause short circuits. This is notably the case with silver fillers.

By applying barrier layers to the actual insulating layer, the brazing material can be prevented from penetrating. However, as a result, the coating method becomes more complex than when using only a ceramic insulating layer. It is known from US 2007/0003811 A1 and US 2007/0065707 A1 to employ mixtures of ceramics with metals as the barrier layers and likewise apply them by thermal spraying.

A short circuit, however, can just as well be caused by brazing material escaping the joining gap during the brazing process.

The ceramic cell generally comprises a nickel cermet (the major component being zirconia, the minor component being nickel oxide and/or nickel) and has a relatively uniform relative thermal expansion in the temperature range of RT to 1000° C., which means it has a temperature-independent thermal coefficient of expansion of $\alpha=12\times10^{-6}$ $K^{-1}$. The sheet metal frame is primarily made of ferritic chromium steel (Fe comprising 22% Cr and other trace elements) and the relative thermal expansion increases with the temperature. The coefficient of expansion increases from $\alpha=11\times10^{-6}$ $K^{-1}$ at low temperatures to $\alpha=14\times10^{-6}$ $K^{-1}$ at 1000° C.

The coefficient of expansion of the solder glass generally cannot be exactly matched to the coefficient of expansion of the steel. However, it is known from WO 2006/086037 to reduce the thermal coefficient of expansion of RAB materials, notably by adding aluminum titanate, and thereby better adapt them to the steel that is used.

The disadvantages of the known prior art can be summarized as follows:

- The brazing materials (RAB) used result in uncontrolled brazing material discharge and running, which can cause short circuits, for example due to bridging between the metal components.
- Relatively large-volume pores and/or pore accumulations develop in the existing joints (RAB) and form cracking points, thereby reducing the mechanical strength of the joint and resulting in leakage (notably in the case of open porosity).
- The capillarity and/or reactivity of the brazing material may result in infiltration, notably in the pores and grain boundaries of the ceramic.
- Contraction (cohesion) of the brazing material and wetting difficulties can lead to defects in the track and thereby cause leaks.

As a result, at present, it is often not possible to reproducibly produce tight, insulating joints.

SUMMARY OF THE INVENTION

It is the object of the invention to create a sealing assembly which provides a sufficient electrical insulating effect, sufficient mechanical strength, and the possibility of a gas-tight seal even at temperatures above 400° C., and notably above 700° C.

It is also an object of the invention to create a sealing assembly, in particular for a high-temperature fuel cell stack, which also exhibits the properties described above at the customary operating temperatures of such a fuel cell.

It is a further object of the invention to provide a simple and cost-effective method for producing such a sealing assembly.

The objects of the invention are achieved by a sealing assembly according to the main claim and by a method for producing such a sealing assembly according to the addi-

DESCRIPTION OF THE PREFERRED EMBODIMENTS

Figure 1:
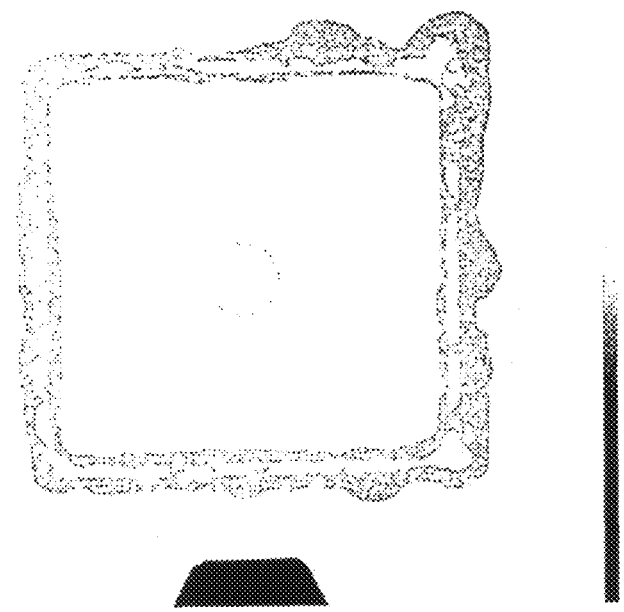
FIG. 1 shows a standard sample.

Within the context of the invention, it was found that the infiltration of a ceramic insulating layer known from the prior art by penetrating brazing material can surprisingly be significantly reduced in thermally sprayed layers when germanium or, most particularly advantageously, germanium and silicon are added to the brazing material at the same time, in suitable quantities.

The sealing assembly according to the invention therefore comprises a ceramic layer and a base brazing material disposed thereon, to which germanium has been added. The assembly has an electrically insulating effect. The quantities of germanium that are required can be determined by a person skilled in the art with little experimentation, and preferably range between 0.5 and 2.5 mol % for Ge, depending on the base brazing material and ceramic used. The added germanium notably has the advantage that it reduces the formation of pores in the brazing material at the same time.

In an advantageous embodiment of the invention, the base brazing material includes added Ge and silicon, with the portion of silicon in the starting brazing material ranging up to 2.5 mol %, and preferably being between 0.1 and 0.9 mol %. Brazing materials having the composition of Ag-2 CuO-1.5 Ge-0.75 Si or Ag-4CuO-1.5 Ge-0.75 Si have proven to be particularly advantageous brazing compounds.

The addition of aluminum titanate has proven to be particularly effective in inhibiting spreading. The quantity of aluminum titanate that is added, relative to the brazing material, is generally stated as percent by volume, however it can also be easily converted into percent by weight or mole percent. Advantageous additions range between 10 and 40% by volume $Al_2TiO_5$, and preferably between 20 and 30% by volume.

The aluminum titanate is generally mixed in with the brazing material as a particularly fine powder because it does not melt during application and brazing, and in this way a homogeneous distribution within the brazing mixture can be ensured.

The present invention is suitable for all joints established between two metal components which must be electrically insulating, yet gas-tight, and is particularly advantageous for use in a high-temperature fuel cell stack having oxide ceramic electrolytes (SOFC=solid oxide fuel cell).

In a specific embodiment of the invention, the sealing assembly comprises a reactive air brazing (RAB) material as the base brazing material. Within the context of this invention, this shall be understood as an Ag-based filler, which has been made into the RAB material by the RAB method (this being brazing in air) and by alloying wetting-active additives.

The ceramic insulating layer is advantageously a layer that has preferably been applied by way of a thermal spraying method. It can be a layer that has been produced by atmospheric plasma spraying, vacuum spraying, or flame spraying. In addition, further suitable methods for applying the ceramic layer would include the sol-gel process or PVD with subsequent sintering.

Advantageously, the ceramic insulating layer is already as tight as possible, so that the lowest possible porosity exists. This shall be interpreted to mean that no open porosity exists down to the substrate (metal component), and that the leakage rate of this ceramic layer in a He leakage test is less than $10^{-3}$ mbar×1×s$^{-1}$.

A foil that is caused to be present by way of brazing on both sides may also be mentioned as a further embodiment of a suitable ceramic layer.

The ceramic layer notably comprises nickel oxide, zirconia, alumina, magnesia or silica, or a mixture of these oxides. In a special embodiment, the ceramic layer comprises an aluminum-magnesium spinel, which can optionally also be provided with a cover layer comprising a mixture of aluminum-magnesium spinel and titanium or a titanium compound.

The addition of silicon and germanium in the particularly advantageous brazing material can easily be achieved by way of directly admixing the corresponding metal powders to the raw powder of the filler. If necessary, the brazing powder mixed in this way can be applied suspended in a binding agent as a paste, such as by screen printing or using a dispenser.

Possible starting brazing materials include silver-based fillers, with or without added copper oxide, which result in a reduced wetting angle and therefore improved wettability. Examples of such silver-based fillers include (in mol %) Ag-4CuO or Ag-8CuO.

Furthermore, additions in the form of $V_2O_5$ and Ti, such as in the form of $TiH_2$, have proven advantageous for wetting the ceramic. These compounds primarily have a wetting effect. In order to produce the brazing materials according to the invention, a homogeneous mixture of the corresponding components is used in powder form. The brazing alloy is then formed in situ from this mixture. If titanium hydride is added, it converts into metallic titanium at temperatures of around 400° C. or into titanium oxide in air.

In particular, the following compositions (in mole percentages) are also suited as base materials for the brazing alloy having no elemental copper, but containing CuO and titanium: Ag-4CuO-0.5TiH$_2$ or Ag-8CuO-0.5TiH$_2$.

An improvement in the brazing process can furthermore be advantageously achieved by reducing the flowability of the brazing material in the liquid state (spreading). This is achieved by adding a suitable ceramic powder, such as aluminum titanate. This measure largely prevents short circuits due to escaping brazing material.

The influences of the different brazing additives can be summarized as follows, with the addition of germanium being imperative for achieving the brazing material according to the invention:

Components that limit infiltration (de-wetting action), for example: Si
Components that reduce the formation of pores, for example: Ge
Components that notably influence wetting, for example: CuO, $V_2O_5$, Ti (added, for example, as $TiH_2$)
Fillers that prevent spreading of the liquid brazing material, for example: $Al_2TiO_5$.

The brazing material can be applied in different ways onto the insulating ceramic layer so as to form the sealing assembly according to the invention.

The brazing material can be applied, for example, as a paste, to the top of the insulating ceramic layer, using a dispenser. As an alternative, the application of the brazing material onto the insulating ceramic layer can be carried out by way of a pattern printing method, such as a screen printing method. Furthermore, it is also possible to dispose the brazing material on the surface of the insulating ceramic layer in the form of a brazing foil. In addition, application on a metal joining partner is also possible.

The use of the special brazing material composition inside the sealing assembly generally results in reproducibly tight and insulating joints having the following properties:

escape of brazing material is prevented and running of brazing material is reduced, the porosity in the brazing material (primarily individual pores or narrow pore lines) is clearly reduced, the brazed joints have sufficient electrical resistance, the brazed joints are generally sufficiently gas-tight, meaning a leakage rate of less than $10^{-3}$ mbar*l*s$^{-1}$ (He leakage test).

In the following description of special embodiments of the invention, for example, the insulating layer of the sealing assembly for a high-temperature fuel cell stack comprises a plurality of layers of ceramic applied by thermal spraying, such as an aluminum-magnesium spinel having a total layer thickness of 20 μm to 150 μm, preferably 30 μm to 70 μm.

The brazing materials according to the invention for the sealing assembly are produced by thoroughly and homogeneously mixing the corresponding raw material powders. If necessary, the brazing powders can be applied suspended in a binding agent as a paste, such as by screen printing or using a dispenser. The starting brazing materials used were silver-based fillers.

Grain sizes of the raw powders used:
Ag 0.7-1.3 μm
CuO 30-50 nm
Ge<140 μm (additionally ground in a mortar)
Si 0.07-0.10 μm
$Al_2TiO_5$ approx. 10 μm (additionally ground in a mortar)

The substance amounts are listed in mol % for the silver-based fillers:
Ag-2CuO Ag-4CuO Examples of a brazing material having reduced infiltration capacity that were analyzed:
Ag-2CuO-1.5Ge-0.75Si, Ag-4CuO-1.5Ge-0.75Si,
Ag-2CuO-1.5Ge-0.5Si,
Ag-1CuO-2Ge, Ag-1.5Ge Analyzed examples of brazing materials having reduced infiltration capacity and reduced spreading tendency are:
Ag-2CuO-1.5Ge-0.75Si+20 Vol.-% $Al_2TiO_5$
Ag-2CuO-1.5Ge-0.75Si+30 Vol.-% $Al_2TiO_5$
Ag-4CuO-1.5Ge-0.75Si+20 Vol.-% $Al_2TiO_5$
Ag-4CuO-1.5Ge-0.75Si+30 Vol.-% $Al_2TiO_5$
Ag-2CuO-1.5Ge-0.5Si+20 Vol.-% $Al_2TiO_5$
Ag-2CuO-1.5Ge-0.5Si+30 Vol.-% $Al_2TiO_5$
Ag-1 CuO-2Ge+20 Vol.-% $Al_2TiO_5$
Ag-1 CuO-2Ge+30 Vol.-% $Al_2TiO_5$
Ag-1.5Ge+20 Vol.-% $Al_2TiO_5$
Ag-1.5Ge+30 Vol.-% $Al_2TiO_5$ Below, the results of two of the above analyses, which clearly show the advantages of the invention, will be compared by way of example. They are two metal-ceramic brazed composites, which are compared using inverted radiographic images of small samples.

Sample no. V105: "Standard" (FIG. 1)
Metal component: Crofer 22APU, 0.5 mm thick.
Ceramic component: Substrate Crofer22APU, 0.5 mm comprising a VPS coating Al—Mg spinel and a cover layer comprising a mixture of Al—Mg spinel and titanium hydride.
Brazing material: Ag 4 CuO (Paste)
Brazing result: Tight and insulating, however disadvantageously exhibits marked running and a certain level of porosity.

Figure 2:
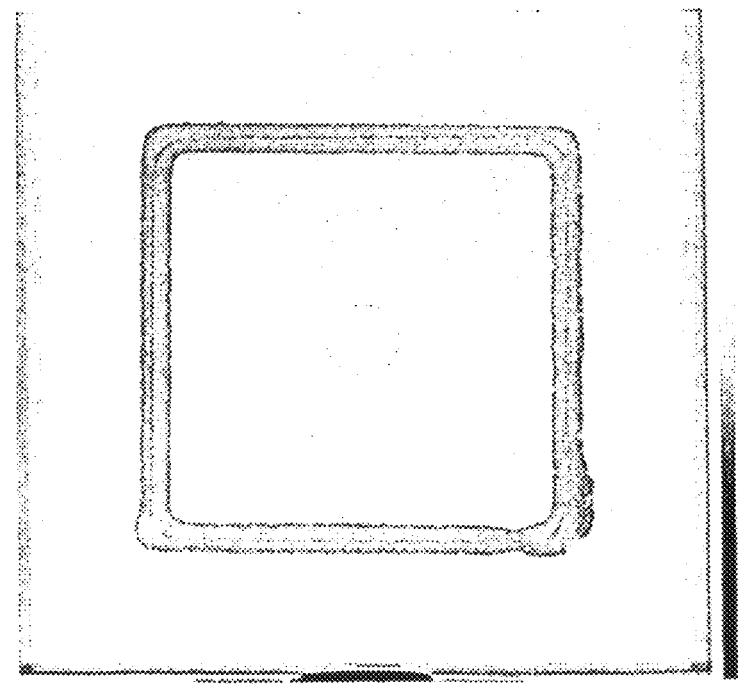
FIG. 2 shows a sample according to the invention.

Sample no. V135: "According to the invention" (FIG. 2)
Metal component: Crofer 22APU, 0.5 mm thick.
Ceramic component: Substrate Crofer 22APU, 0.5 mm comprising a VPS coating Al—Mg spinel
Brazing material: Ag-4CuO-1.5Ge-0.75Si+20 Vol.-% $Al_2TiO_5$ (Paste)
Brazing result: Tight and insulating, with almost no running and low porosity.

The invention claimed is:

1. A sealing assembly for metal components, the sealing assembly having an electrical insulating property by which said metal components are electrically insulated from each other by the sealing assembly, the sealing assembly configured as a gas-tight seal between said metal components at temperatures above 400 degrees Celsius, the sealing assembly comprising:
a ceramic layer which is an electrical insulator, the ceramic layer having pores and grain boundaries;
a brazing material disposed on and in contact with the ceramic layer without a barrier layer between the ceramic layer and the brazing material;
the brazing material having a composition configured to reduce infiltration of the brazing material into the ceramic layer at pores and grain boundaries of the ceramic layer;
said brazing material composition comprising:
a base brazing material;
germanium at an amount that reduces pore formation in the brazing material; and
silicon at an amount that reduces capillarity of the base brazing material,
wherein the amount of germanium is in the range of 0.1 to 5.0 mol %; and
wherein the amount of silicon is greater than 0 and up to 2.5 mol %.

2. The sealing assembly according to claim 1, wherein said amount of germanium is in the range of 0.5 to 2.5 mol %.

3. The sealing assembly according to claim 1, wherein said amount of silicon is in the range of 0.1 and 0.9 mol %.

4. A sealing assembly according to claim 1, wherein said brazing material composition is Ag-2CuO-1.5Ge-0.75Si or Ag-4CuO-1.5Ge-0.75Si.

5. A sealing assembly according to claim 1, comprising further added aluminum titanate.

6. The sealing assembly according to claim 5, comprising aluminum titanate in the range of 10 to 40% by volume.

7. A sealing assembly according to claim 1, wherein said brazing material composition comprises a reactive air brazing (RAB) material.

8. A sealing assembly according to claim 1, wherein said ceramic layer is applied by a thermal spraying method, a sol-gel method or by PVD and subsequent sintering.

9. A sealing assembly according to claim 1, comprising a foil that is brazed in on both sides as the ceramic layer.

10. A sealing assembly according to claim 1, wherein said ceramic layer comprises nickel oxide, zirconia, alumina, magnesia or silica, or a mixture of these oxides.

11. A sealing assembly according to claim 1, wherein said ceramic layer comprises, aluminum-magnesium spinel.

12. The sealing assembly according to claim 11, comprising a cover layer which comprises a mixture of aluminum-magnesium spinel and titanium or a titanium compound and is disposed on the ceramic layer.

13. The sealing assembly according to claim 5, comprising aluminum titanate in the range of 20 to 30% by volume.

* * * * *